United States Patent
Takahashi et al.

(10) Patent No.: US 6,918,277 B2
(45) Date of Patent: Jul. 19, 2005

(54) METHOD OF WORKING END PART OF METALLIC TUBE BODY AND METALLIC TUBE BODY, AND METHOD OF MANUFACTURING VIBRATIONPROOF BUSH USING THE WORKING METHOD AND VIBRATIONPROOF BUSH

(75) Inventors: Hiroaki Takahashi, Osaka (JP); Tadayuki Suzuki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 145 days.

(21) Appl. No.: 10/363,572

(22) PCT Filed: Apr. 19, 2001

(86) PCT No.: PCT/JP01/03375

§ 371 (c)(1),
(2), (4) Date: Feb. 28, 2003

(87) PCT Pub. No.: WO02/085582

PCT Pub. Date: Oct. 31, 2002

(65) Prior Publication Data

US 2004/0011103 A1 Jan. 22, 2004

(51) Int. Cl.$^7$ ................................................. B21D 1/02
(52) U.S. Cl. ............................. 72/112; 72/67; 72/115; 72/117
(58) Field of Search .......................... 72/67, 112, 115, 72/117, 370.12, 370.13, 370.25

(56) References Cited

U.S. PATENT DOCUMENTS

| | | | | |
|---|---|---|---|---|
| 2,557,017 A | * | 6/1951 | Stahl ........................... | 493/293 |
| 2,848,804 A | * | 8/1958 | Graves et al. ................. | 72/112 |
| 4,905,492 A | * | 3/1990 | Lobakk ........................ | 72/117 |
| 5,301,414 A | | 4/1994 | Gautheron | |
| 5,465,598 A | | 11/1995 | Hirai et al. | |
| 5,622,071 A | * | 4/1997 | Van Riper et al. ............ | 72/117 |
| 6,626,020 B2 | * | 9/2003 | Kawada et al. ................ | 72/67 |
| 2003/0192358 A1 | * | 10/2003 | Gouiran ....................... | 72/115 |

FOREIGN PATENT DOCUMENTS

| | | | | |
|---|---|---|---|---|
| AU | 133014 | * | 7/1946 | .................. 72/112 |
| JP | 49-32860 | | 3/1974 | |
| JP | 11-189022 | | 7/1999 | |

* cited by examiner

Primary Examiner—Ed Tolan
(74) Attorney, Agent, or Firm—Knobbe Martens Olson & Bear, LLP

(57) ABSTRACT

This invention has an object of diminishing an inside diameter while securing the area of the terminal edge larger, at the extremity of a cylindrical body made of a metal used for a vibration isolating bushing and the like. Accordingly, the present invention provides a manufacturing method of vibration isolating bushing 10 serving to stick the rubber elastomer 16 to the outer circumference of an inner cylinder 12 made of a metal by means of vulcanization forming, by diminishing in diameter the extremity 18 by cold plastic working while turning a diameter diminishing jig 40 and pressing against the circumferential surface of the axial extremity 18 of the inner cylinder 12, and further by enlarging and forming the terminal edge 19 by cold plastic working while turning an upsetting jig 50 and pressing against the terminal edge 19 at the extremity 18 being diminished in diameter.

9 Claims, 15 Drawing Sheets

Prior Art

Prior Art

METHOD OF WORKING END PART OF METALLIC TUBE BODY AND METALLIC TUBE BODY, AND METHOD OF MANUFACTURING VIBRATIONPROOF BUSH USING THE WORKING METHOD AND VIBRATIONPROOF BUSH

TECHNICAL FIELD

This invention relates to a working method of a cylinder made of a metal at extremities, the cylindrical body made of a metal with its extremities worked by that method, a manufacturing method of a vibration isolating bushing by utilizing this working method, and the vibration isolating bushing manufactured by the manufacturing method. The present invention is suitable for a vibration isolating bushing mainly used, being built-in in a suspension system of an automobile, etc.

BACKGROUND OF THE INVENTION

In an automobile suspension system, tubular vibration isolating bushings have been used for the purposes of vibration damping and shock absorbing at connecting parts of the vehicle body and the suspension, namely, each connecting part between a support member such as a control arm (lower arm, etc.) carrying wheels, and a body side member such as body frame and the like. Besides, the tubular vibration isolating bushings may also be used for an engine mount for supporting an engine to isolate vibration.

FIG. 14 shows a conventional vibration isolating bushing 100. The bushing 100 comprises an inner cylinder 101 and an outer cylinder 102, both made of a metal and disposed concentrically, and a rubber elastomer 103 interposed between both cylinders. As for the vibration isolating bushing 100, in the state of use, an axial member 104 is inserted into the inner cylinder 101, and the vibration isolating bushing 100 is fastened and secured to support members 105 such as brackets that hold both ends of inner cylinder 101 in between. The outer cylinder 102 is press-fitted and secured against an attachment hole 107 of other support members 106.

Thus, the inner cylinder 101 of the vibration isolating bushing 100 is held at both ends between the support members 105. Accordingly, if the areas of the terminal edges 108 of the inner cylinder 101 are small, their surface pressures receiving an axial force due to fastening are high, the support members 105 such as brackets, which are press-formed out of plate materials, are depressed, giving rise to problems such as looseness of bolts, etc.

Therefore, in order to inhibit surface pressures against the axial force due to fastening at the terminal edges less than the predetermined level, a technique is taken by entirely thickening the thickness of the inner cylinder 101 assuming a straight form and also by enlarging the areas of the terminal edges 108 constituting a contact surface with the support member 105. However, in case where a thick inner cylinder 101 is used, although the areas of the terminal edges 108 of the inner cylinder 101 receiving the axial force grow larger, there is a drawback in that weight is increased greatly.

As shown in FIG. 15, there is also a technique of enlarging the areas of the terminal edges 108 constituting a contact surface with the support member 105 by making use of an oddly shaped inner cylinder 101, both extremities 109 of which are formed thicker than an inward portion. However, in this case, the oddly shaped inner cylinder 101 is preformed by one of the working methods such as forging, etc., accordingly leading to higher cost. Further, when the rubber elastomer 103 is vulcanization formed, also in connection with die release after forming, a free length cannot be secured sufficiently at the terminal edges 110 of the rubber elastomer 103, so that there is a problem that durability grows worse. That is, when the extremities 109 of the inner cylinder 101 are previously formed to be upset, an inward portion 111 of smaller diameter than that at the upset extremities 109 assumes an undercut shape against die release in the axial direction, with the result that the terminal edges 110 of the rubber elastomer 103 cannot be set to the position indicated by a two-point chain line 112. Therefore, the areas of the rubber elastomer 103 at the terminal edges 110 become smaller, a free length from elastic deformation cannot be secured sufficiently.

As shown in FIG. 16, it is disclosed in an official gazette JP-A-5-200438 that the extremities 109 of the inner cylinder 101 are formed to be upset by subjecting to cold plastic working with the aid of an upsetting jig 120, after vulcanization forming of the rubber elastomer 103, to enlarge the terminal edges 108. In the official gazette, the upsetting jig 120 having a protrusion 121 at the center on the tip surface is employed. By pressing the upsetting jig 120 against the terminal edges 108 of the inner cylinder while turning the upsetting jig 120 in a conical orbit centering an axis 122 of the inner cylinder 101, the terminal edges 108 are enlarged as shown in FIG. 17.

According to this method, the areas of the terminal edges 108 of the inner cylinder 101 can be made larger without using a thick inner cylinder, and the areas of the terminal edges 110 of the rubber elastomer 103 can also be enlarged to secure sufficiently a free length from elastic deformation. However, according to the upsetting method disclosed in the official gazette, since not only outside diameter D0 but also inside diameter d0 of the inner cylinder 101 at the extremities 109 are upset as shown in FIG. 17, the areas of the inner cylinder at the terminal edges 108 become narrower by the upset area of the inside diameter d0. Accordingly, it is difficult to secure sufficient area to reduce surface pressure for the axial force described above.

As shown in FIG. 14, when the axial member 104 having a bolt 130 at the tip is inserted into the inner cylinder 101 and fastened and secured to the support member 105 by a nut 131, it is preferably to diminish the inside diameter at the extremities of the inner cylinder 101 for positioning the bolt 130. However, since the inside diameter d0 is also upset according to the method disclosed in the official gazette, it is not possible to perform such positioning. Further, a problem is encountered that it is difficult to diminish the inside diameter of the inner cylinder at the extremities during forging process.

DISCLOSURE OF THE INVENTION

In view of the aforementioned problems or difficulties, this invention has an object of diminishing an inside diameter while securing the area(s) of the terminal edge surface (s) larger, at the extremities or extremity of a cylinder made of a metal.

It is an object of the present invention to secure large area(s) of the terminal edge(s) of the inner cylinder at the extremities (or extremity), and also diminish an inside diameter for a vibration isolating bushing, in which the rubber elastomer is vulcanization formed at the outer circumference of the inner cylinder made of a metal.

The extremities (extremity) working method of the cylindrical body made of a metal according to the present invention comprises the diameter diminishing process of the extremities (extremity) by the cold plastic working while turning a first jig and pressing against the circumferential surface for the axial extremities (extremity) of the cylindrical body made of a metal, and the enlarging process of enlarging the terminal edge surface(s) by the cold plastic working while turning a second jig and pressing against the terminal edge surface(s) for the extremities (extremity) the diameter of which is diminished.

In this manner, since the extremities (extremity) of the cylindrical body made of a metal are (is) diminished in diameter once by pressurization turning motion of the first jig and then upset by pressurization turning motion of the second jig, the inside diameter can be diminished while securing the areas of the terminal edge surface(s) largely. That is, since the terminal edge surface(s) are (is) enlarged and the extremities (extremity) are (is) diminished in diameter on the inside diameter side, the cylindrical body made of a metal obtained by the working method of the present invention can be used for various machine parts including automobile parts such as vibration isolating bushing described later.

As aforementioned, the extremities (extremity) to be worked may be either both extremities or only one extremity of the cylindrical body in the axial direction. For example, one axial extremity of the cylindrical body may be upset by the cold plastic working without being diminished in diameter, and the aforementioned diameter diminishing and enlarging processes may be carried out for the other extremity.

The first jig can be provided with a concave portion, which receives the extremities of the cylindrical body. The first jig is formed so that, the deeper the inner circumferential surface of the concave portion is, the smaller the diameter becomes. In the diameter diminishing process above, the extremities of the cylindrical body can be diminished effectively, by pressing the inner circumferential surface against the extremities (extremity) circumferential surface of the cylindrical body, while turning the first jig in a conical orbit centering an axis of the cylindrical body.

A jig with nearly flat tip surface can be used as the second jig described above. In the enlarging process, the tip surface of the second jig can be pressed against the terminal edge(s) of the cylindrical body while turning in a conical orbit centering an axis of the cylindrical body. Thus, by upsetting the extremities (extremity) of the inner cylinder according to the pressurization turning motion using a flat jig without any protrusion at the tip surface, the extremities (extremity) on the outside diameter side can only be upset while inhibiting on the inside diameter side of the inner cylinder at the extremities (extremity) from upsetting. Accordingly, the area(s) of the terminal edge(s) of the inner cylinder can be secured further. In this case, since the tip surface of the second jig slightly projects in the form of a conical surface, it is desirable to incline the second jig against the axis of the cylindrical body so that the conical surface becomes roughly perpendicular to the axial direction of the cylindrical body during the enlarging process.

As for the enlarging process described above, the extremities of the cylindrical body may be upset by the pressurization turning motion of the second jig so that the outside diameter of the cylindrical body at the extremities is nearly equal to that prior to being diminished in diameter. That is, when the outside diameter of the cylindrical body at the extremities (extremity) is nearly equal to that prior to being diminished in diameter, the pressurization turning motion of the second jig may be finished. In this case, the terminal edge surface(s) can be enlarged by diminishing in diameter on the inside diameter side, without upsetting the cylindrical body on the outside diameter side.

In the enlarging process described above, the extremities (extremity) of the cylindrical body may be upset so that the outside diameter of the cylindrical body at the extremities (extremity) becomes larger than that prior to being diminished in diameter. That is, after the outside diameter of the cylindrical body at the extremities (extremity) becomes larger than that prior to being diminished in diameter, the pressurization turning motion of the second jig may be finished. In this case, the outside diameter side of the cylindrical body is upset and the inside diameter side is diminished so that the terminal edges can further be enlarged.

The manufacturing method of vibration isolating bushing according to the present invention is the manufacturing method of the vibration isolating bushing serving to stick the rubber elastomer to the outer circumference of the inner cylinder made of a metal by means of vulcanization forming, and comprises the diameter diminishing process for diminishing in diameter of the extremities (extremity) by the cold plastic working while turning a first jig and pressing against the circumferential surface of the inner cylinder at the axial extremities (extremity), and the enlarging process for enlarging and forming the terminal edges by the cold plastic working while turning a second jig and pressing against the terminal edge surface(s) of the extremities (extremity) being diminished in diameter.

According to the manufacturing method of the present invention, with the areas of the terminal edges largely secured without thickening the thickness of entire inner cylinder, the vibration isolating bushing is obtained, having the inner cylinder the inside diameter of which is diminished. Accordingly, the terminal edge surface(s) of the inner cylinder can be enlarged with its weight and cost reduced. Since the inside diameter of the inner cylinder at the extremity is diminished, it is possible to position the bolts of the axial member which is inserted into the inner cylinder, with the result of good assembling operations of vibration isolating bushing.

As for the manufacturing method of the vibration isolating bushing of the invention, the diameter diminishing and enlarging processes are carried out for the inner cylinder after vulcanization forming the rubber elastomer on the outer circumference of the inner cylinder, and vulcanization forming of the rubber elastomer is also performed on the outer circumference of the inner cylinder, the extremities (extremity) of which is worked, after the diameter diminishing and enlarging processes described above are carried out for the inner cylinder.

In case of the former, since the extremities (extremity) of the inner cylinder are worked after vulcanization forming, it is more preferably that a free length of the rubber elastomer can sufficiently be secured even if the extremities (extremity) of the inner cylinder is upset so that the outside diameter of the inner cylinder at the extremities (extremity) becomes larger than that prior to being diminished.

On the contrary, in the latter case, since the inner cylinder is vulcanization formed after working the extremities (extremity), a free length of the rubber elastomer cannot be secured sufficiently during the enlarging process, in connection with die release after vulcanization forming, when the outside diameter of the inner cylinder at the extremities (extremity) is made larger than that prior to being diminished. Accordingly, it is preferable that the extremities (extremity) of the inner cylinder are upset so that the outside diameter of the inner cylinder at the extremities (extremity) is nearly on a par with that prior to being diminished in this case, thus a free length of the rubber elastomer can sufficiently be secured.

The first and second jigs, similar to those used for the aforementioned working method of cylinders made of a metal, can also be used for the manufacturing method of the vibration isolating bushing of the invention.

BEST MODE FOR CARRYING OUT THE INVENTION

Figure 1:
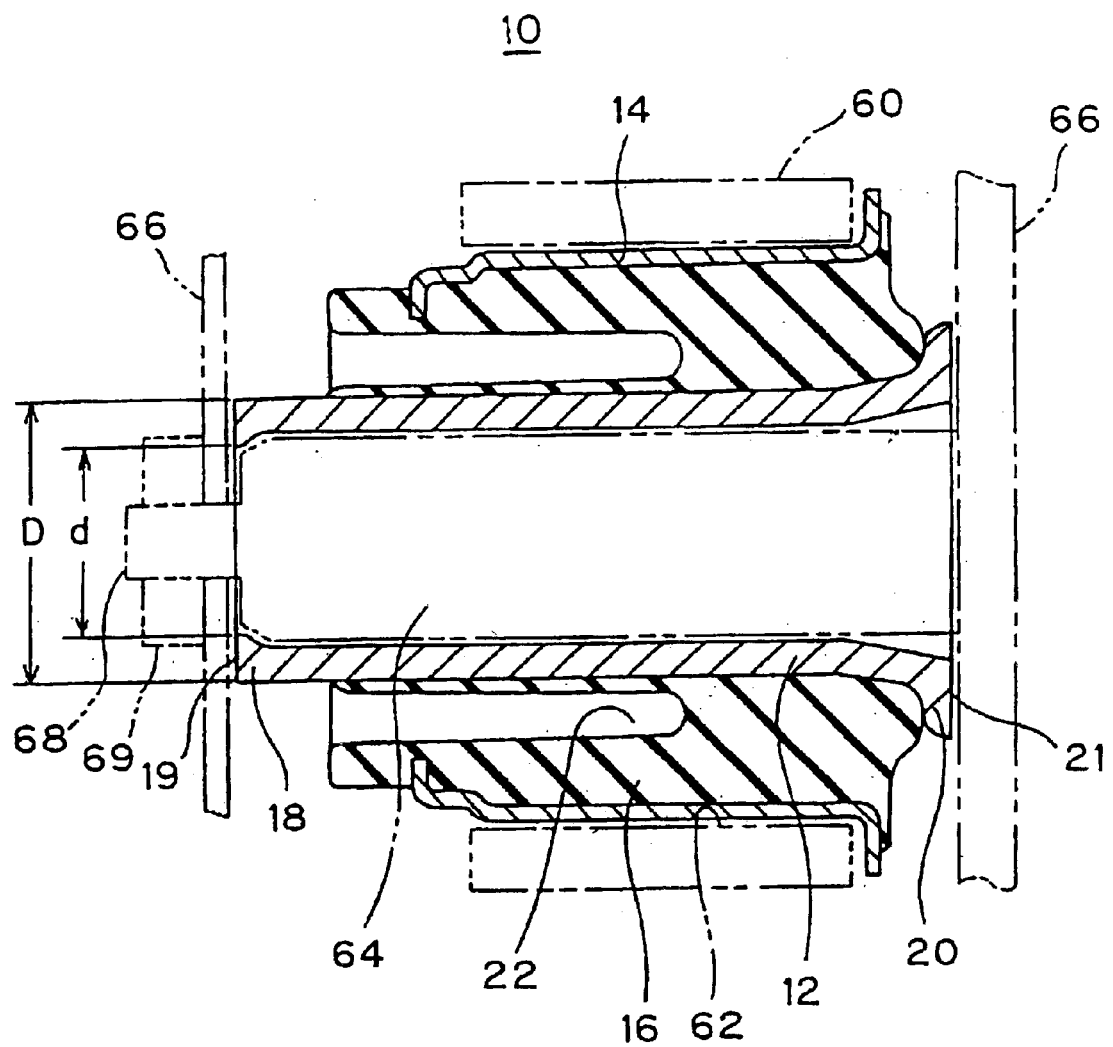
FIG. 1 is a sectional view of a vibration isolating bushing according to the first embodiment of the invention.

Embodiments of the invention will be hereinafter described by referring to the drawings.

A vibration isolating bushing 10 according to the first embodiment of the invention is described with reference to FIGS. 1 to 10.

As shown in FIG. 1, the vibration isolating bushing 10 comprises inner and outer cylinders 12, 14 constituting a cylindrical body made of a metal such as iron, steel or aluminum or alloys thereof, etc. disposed at spaces in parallel with an axis, a rubber elastomer 16 vulcanization formed and interposed between the inner and outer cylinders 12, 14 and integrally interconnecting both cylinders, the rubber elastomer 16 being stuck to both the outer circumferential surface of the inner cylinder 12 and the inner circumferential surface of the outer cylinder 14 by means of a vulcanization adhesion means. The inner cylinder 12 is longer than the outer cylinder 14, both extremities 18, 20 in the axial direction thereof protruding from both ends of the outer cylinder 14. At both extremities 18, 20 of the inner cylinder 12, terminal edges 19, 21 are enlarged and formed by the cold plastic working as compared with normal thick terminal edges.

Figure 2:
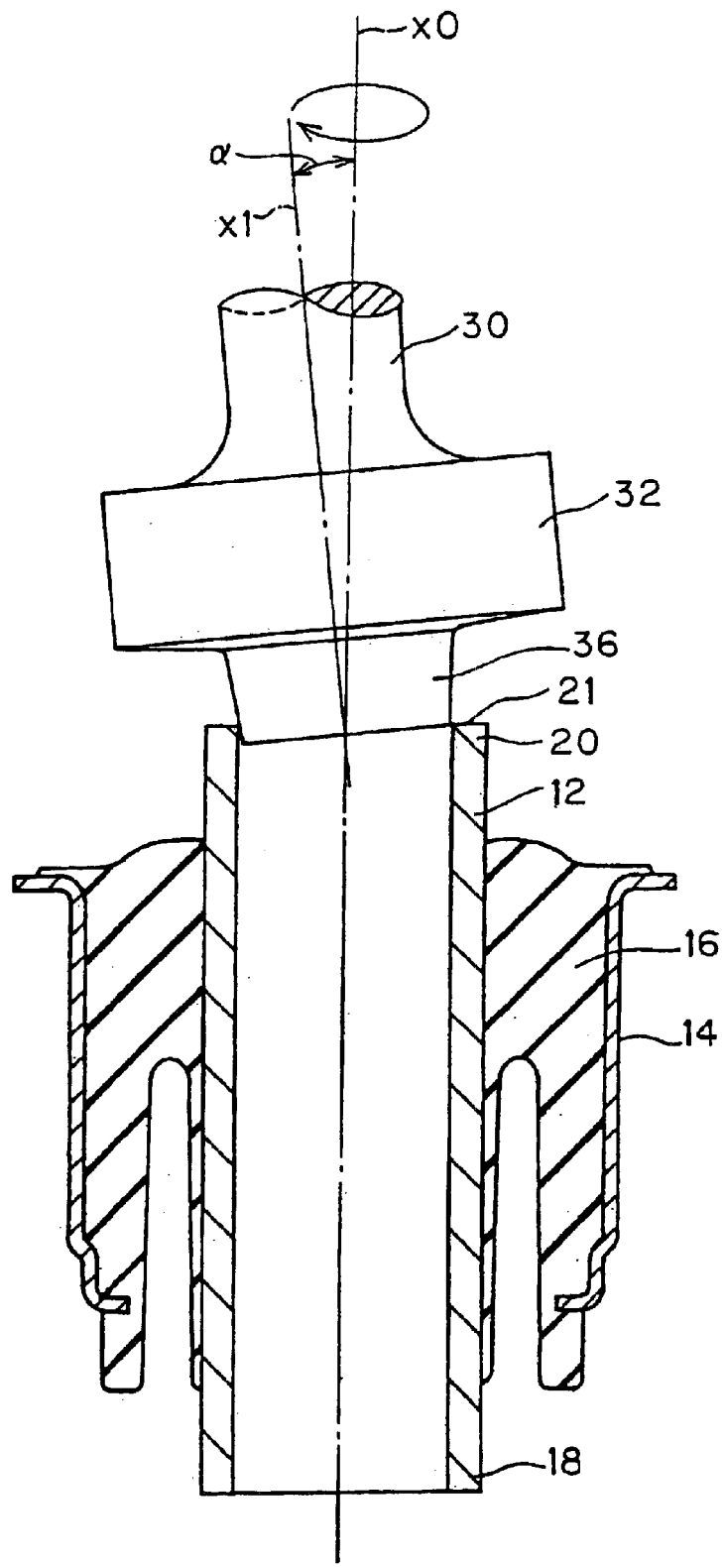
FIG. 2 is a sectional view at an initial stage of the first process (upsetting) of the first embodiment.

To produce the vibration isolating bushing 10, the rubber elastomer 16 is first vulcanization formed between the inner and outer cylinders 12, 14 according to an officially known vulcanization forming method. At that time, as shown in FIG. 2, with extremity working taken into account, a straight pipe of slightly longer than the product size is used as the inner cylinder 12.

Then, the first process (upsetting) is performed for the vulcanization formed body. The first process serves to upset one extremity 20 of the inner cylinder 12 according to plastic working, with the result of being subjected to cold plastic deformation. That is, as shown in FIG. 2, with respect to the extremity 20 of the inner cylinder 12, a first upsetting jig 30 is turned and pressed against the terminal edges 21 so as to be enlarged and formed by cold plastic working. The extremity 20 is opposite to the side of the inner cylinder 12 into which a bolt 68 described later is inserted.

Figure 8:
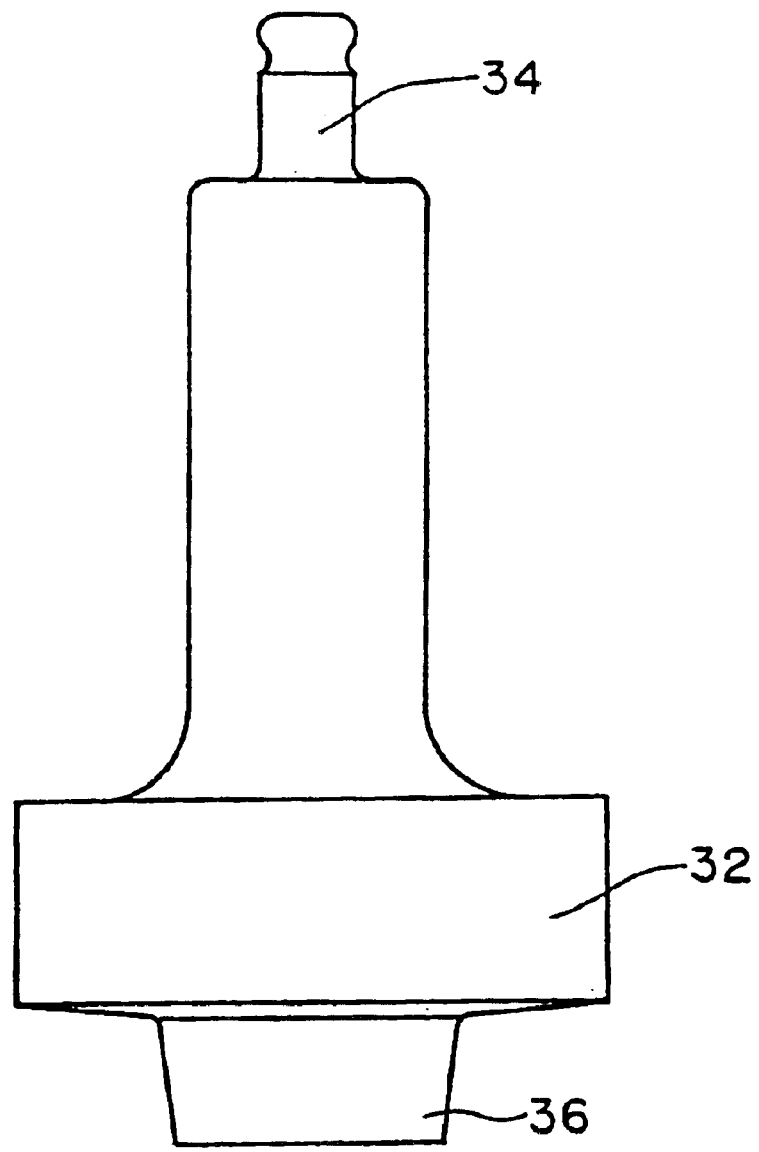
FIG. 8 is a side elevation view of a jig used for the first process.

As shown in FIG. 8, the first upsetting jig 30 is provided with a circular cylindrical portion 32 of larger diameter on the lower end side, and an attachment portion 34 at the upper end is to be attached to a rotation device (not shown). A protrusion 36 is provided at the center on the tip surface of the circular cylindrical portion 32. The protrusion 36 has slightly smaller inside diameter than the inner cylinder 12 at the tip, and is slightly larger than the inside diameter of the inner cylinder 12 at the base, being of the form of a truncated cone.

The first upsetting jig 30 is attached to the rotation device with its axial center x1 inclined against an axis x0 of the inner cylinder 12 by a definite angle α. And, while the axial center x1 rotates along a circular cone centering the axis x0 of the inner cylinder 12 according to the movement of the rotation device, the terminal edges 21 of the inner cylinder 12 are forced by the tip surface thereof. The angle α is normally set to 3 to 10°.

Figure 3:
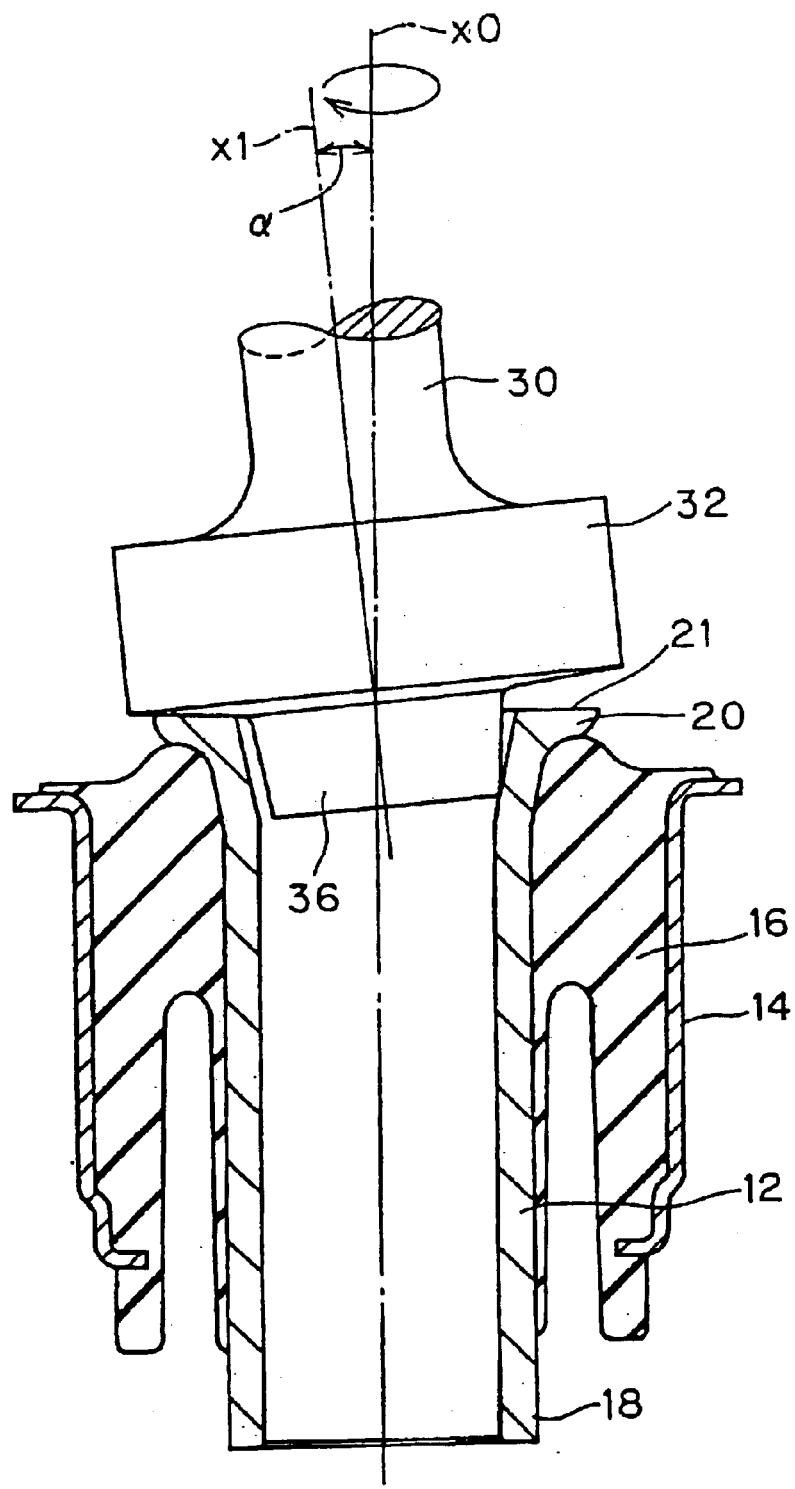
FIG. 3 is a sectional view at a final stage of the first process.

Thus, as shown in FIG. 3, when the outside diameter of the inner cylinder 12 at the extremities 20 is upset to a given size by turning the first upsetting jig 30, the first process is completed.

Figure 4:
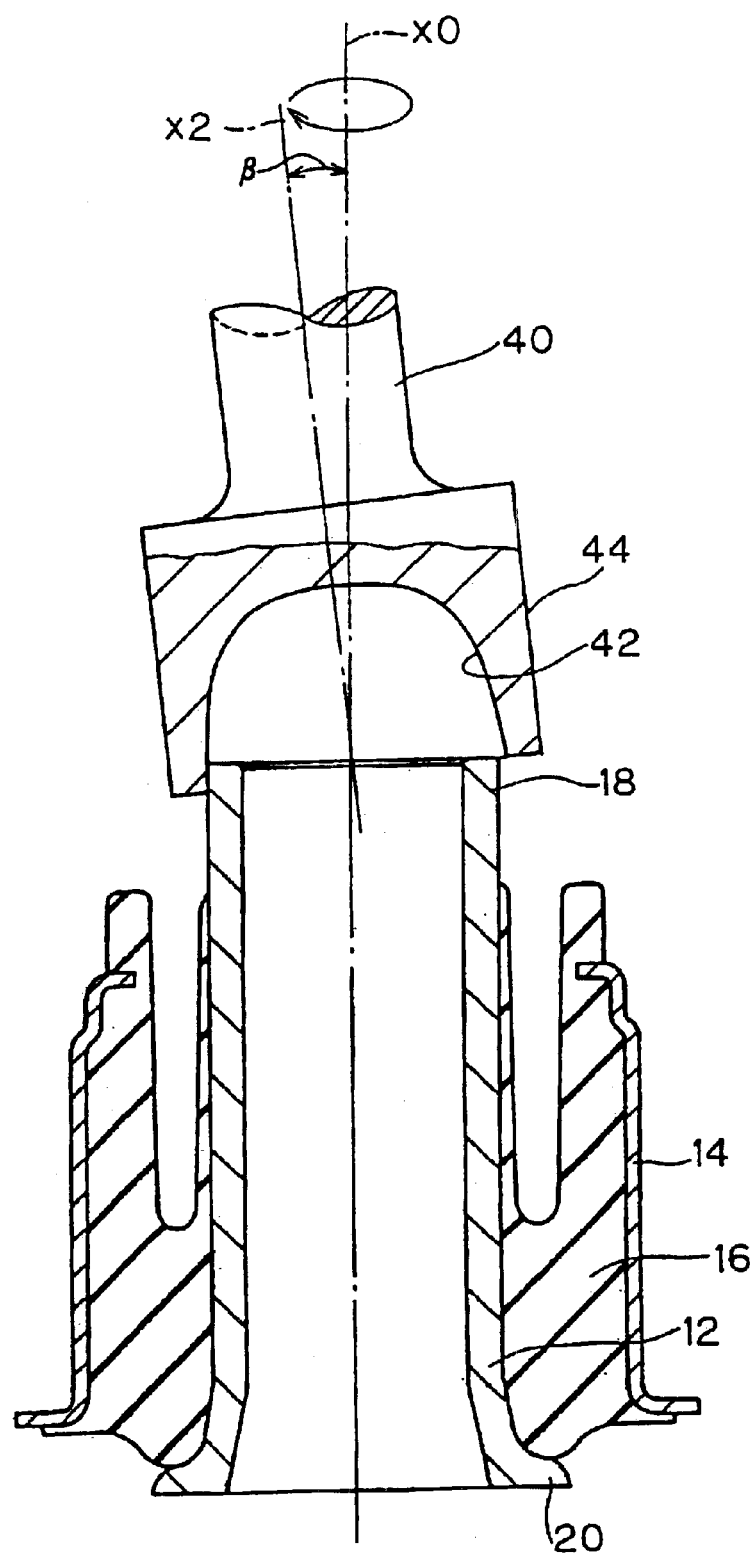
FIG. 4 is a sectional view of the second process (diminished in diameter) at an initial stage of the first embodiment.

Then, the vulcanization formed body is reversed to carry out the second process (diminished in diameter). As shown in FIG. 4, in the second process, while turning in a circular conical orbit centering the axis x0 of the inner cylinder 12, a diameter diminishing jig 40 is pressed against an outer circumferential surface of the other extremities 18 of the inner cylinder 12, whereby diminishing the extremities 18 in diameter. Incidentally, a bolt 68 described later is inserted from the extremities 18.

Figure 9B:
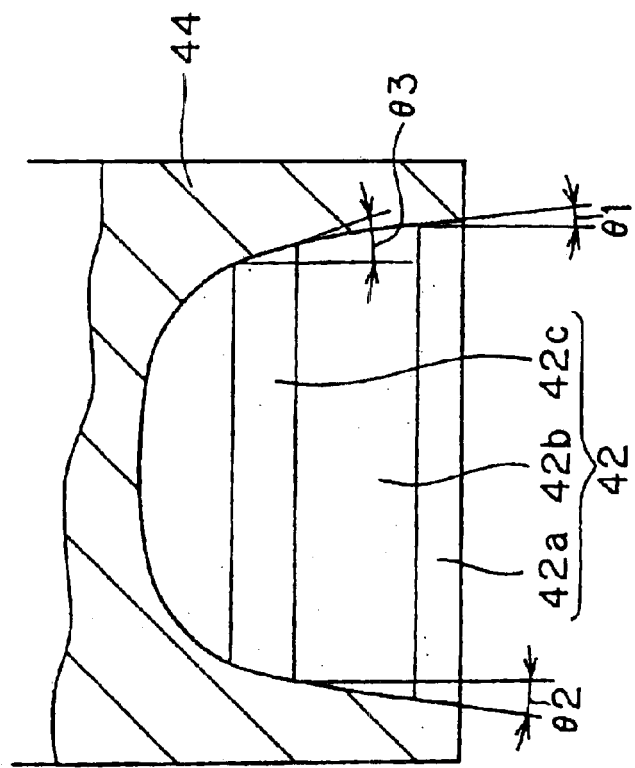
FIG. 9B is an enlarged view of a tip portion shown in FIG. 9A.
Figure 9A:
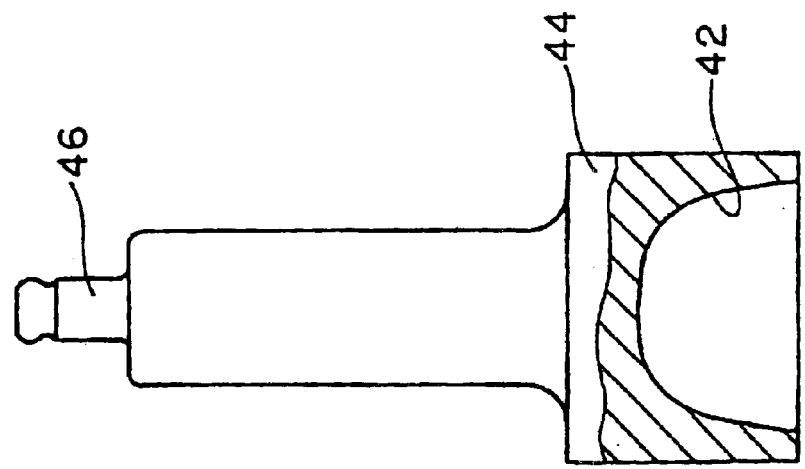
FIG. 9A is a side elevation view of a jig used for the second process.

As shown in FIG. 9A, the diameter diminishing jig 40 is provided on the lower end side with a circular cylindrical portion 44 of larger diameter having a concave portion 42, which encloses the outer circumference of the extremities 18 of the inner cylinder 12 and receives the extremities 18, and an attachment portion 46 at the upper end will be attached to the rotation device. The concave portion 42 is a cavity in the form of a truncated cone having an opening at the tip surface of the diameter diminishing jig 40 on the bottom surface of the cylindrical portion 44, and the deeper the inner circumferential surface the smaller its diameter becomes. An angle of inclination of the inner circumferential surface is normally set to 5 to 20°. As for this embodiment in detail, as shown in FIG. 9B, an angle of inclination θ1 at the lower extremities 42a is 5°, θ2 on the deeper side at the center 42b is 10°, and θ3 on the further deeper side at the upper portion 42c is 15°. Thus, the deeper the concave portion 42 is, the larger the angle of inclination is set. Each inclined surface is connected smoothly through each curved surface. A bottom surface (top surface) of the concave portion 42 is also curved.

As shown in FIG. 4, the diameter diminishing jig 40 is attached to the rotation device with the axial center x2 inclined to the axis x0 of the inner cylinder 12 by a definite angle β. And, while the axis x2 turns and moves on the conical surface centering the axis x0 of the inner cylinder 12 according to the movement of the rotation device, the inner circumferential surface of the concave portion 42 is forced against the outer circumferential surface of the extremities 18 of the inner cylinder 12. The angle of inclination β is normally set to 3 to 10°.

Figure 5:
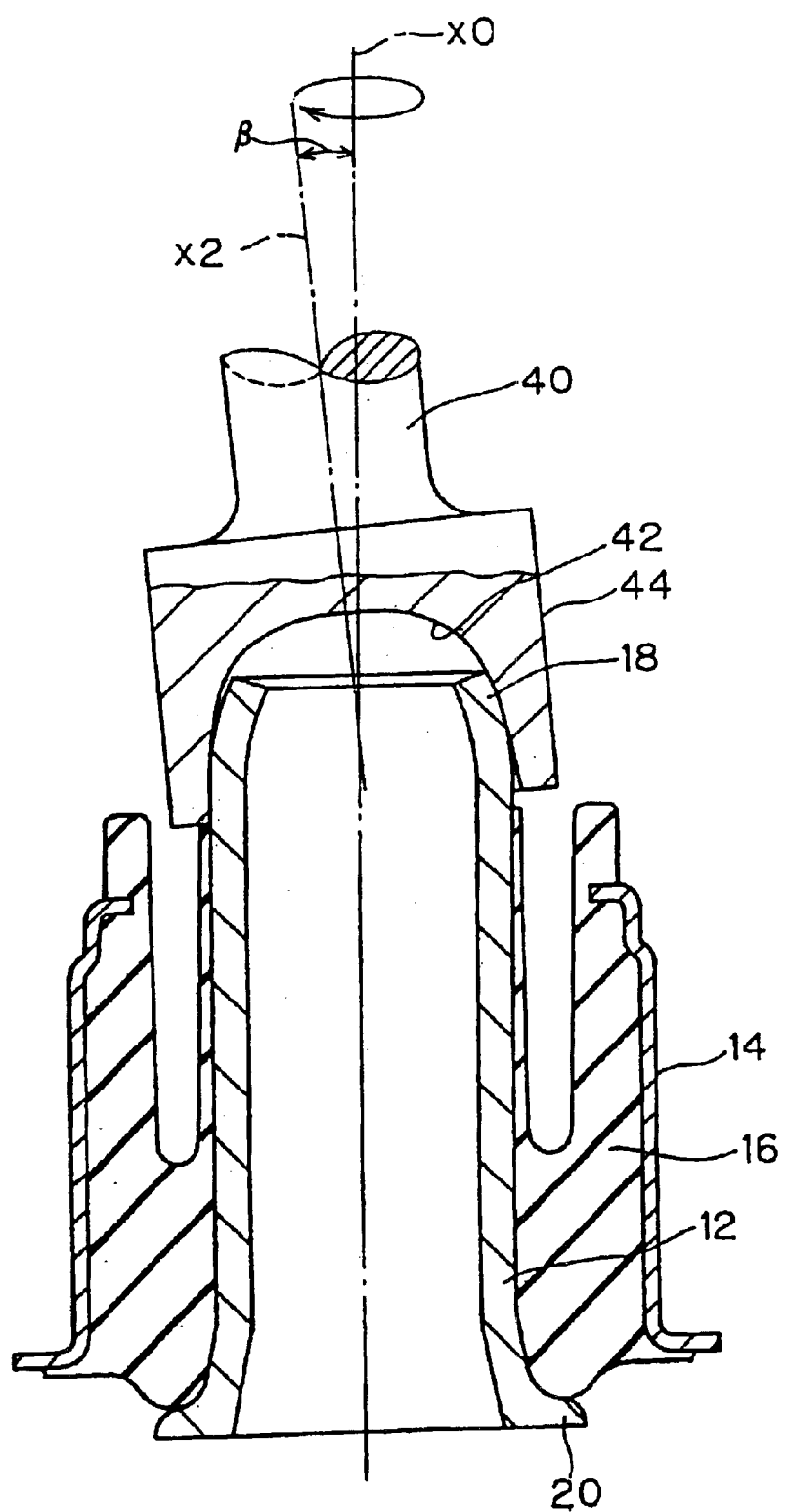
FIG. 5 is a sectional view of the second process at a final stage of the first embodiment.

Thus, as shown in FIG. 5, when the extremities 18 of the inner cylinder 12 are deformed toward radially and inwardly by the predetermined amount by turning the diameter diminishing jig 40, the second process is completed.

Figure 6:
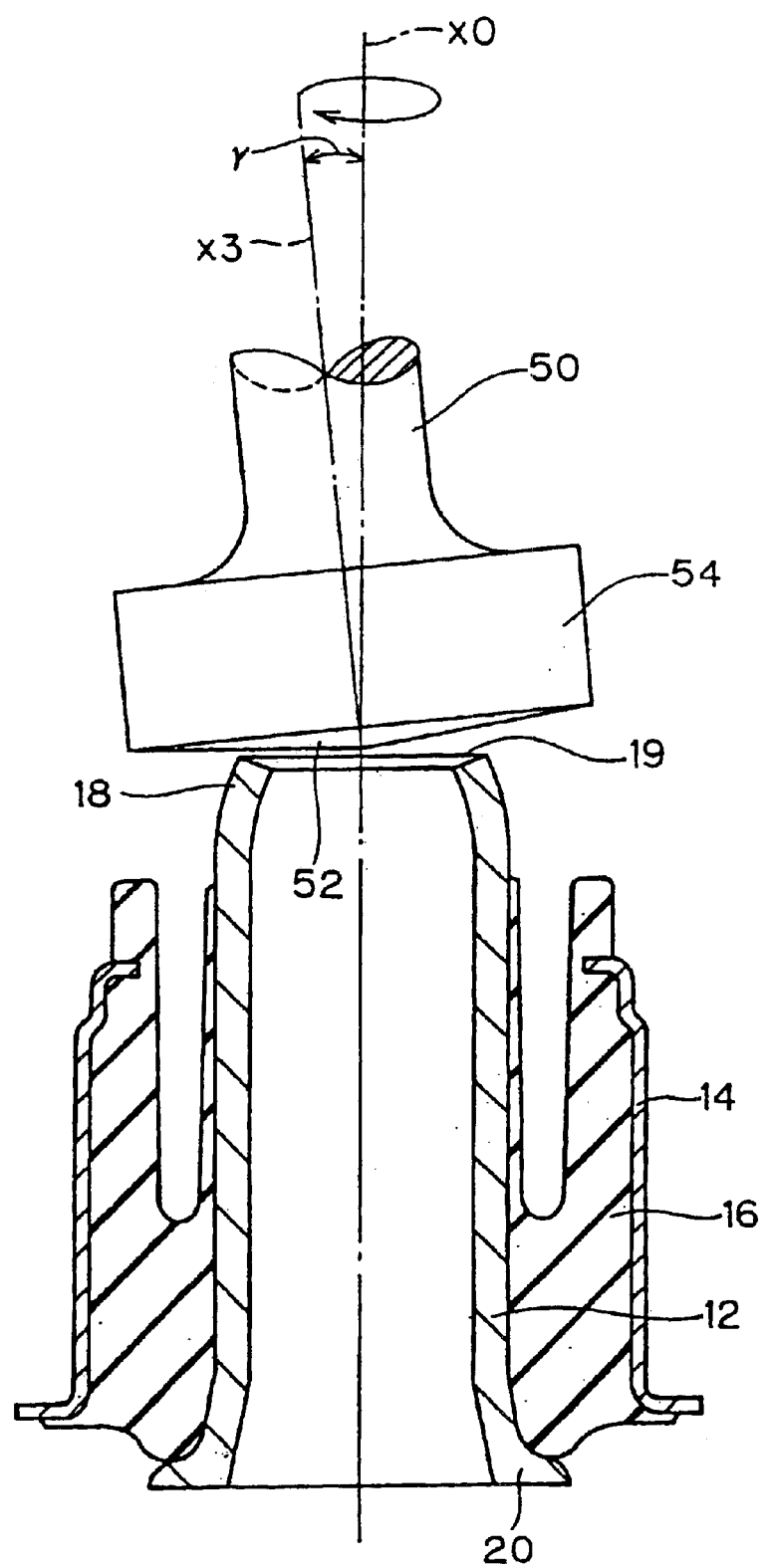
FIG. 6 is a sectional view of the third process (enlarging) at an initial stage of the first embodiment.

Then, the third process (upsetting) is carried out for the extremities 18 diminished in diameter. As shown in FIG. 6, the third process is a process of enlarging and forming the terminal edges 19 by the cold plastic working while turning the second upsetting jig 50 and pressing against the terminal edges 19.

Figure 10:
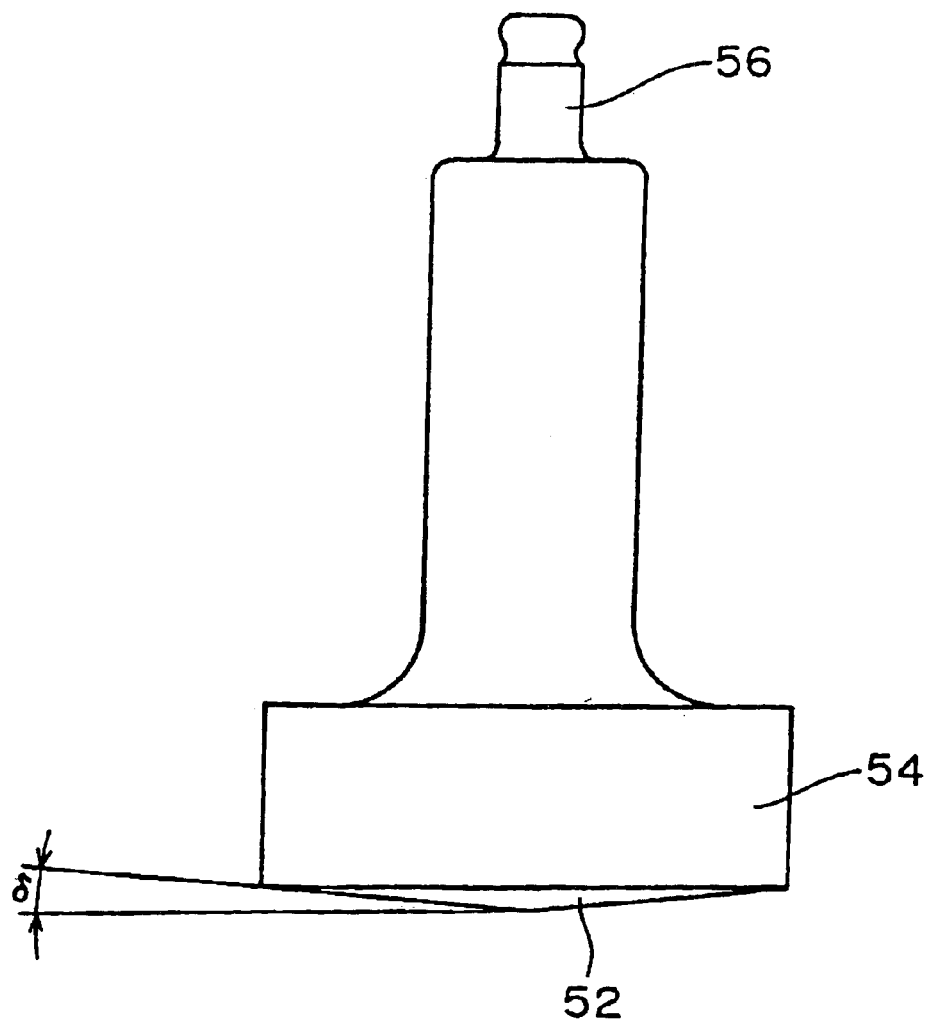
FIG. 10 is a side elevation view of the jig used for the third process.

As shown in FIG. 10, the second upsetting jig 50 is provided with a circular cylindrical portion 54 of larger diameter on the lower end side to be pressed against the inner cylinder 12, and an attachment portion 56 at the upper end is to be attached to the rotation device. And, the tip surface 52 of the second upsetting jig 50 on the lower surface of the circular cylindrical portion 54 is formed in the form of nearly flat conical surface slightly protruding toward downwardly, that is, forwardly in the forcing direction. An angle of inclination δ of the conical surface (tip surface) is normally set to 0 to 10°. As shown in FIG. 6, the diameter of the circular cylindrical portion 54 is set sufficiently larger than the outside diameter of the inner cylinder 12.

The second upsetting jig 50 is attached to the rotation device with its axial center x3 inclined against an axis x0 of the inner cylinder 12 so as to have a definite angle γ. And, while the axial center x3 rotates along a circular cone centering the axis x0 of the inner cylinder 12 according to the movement of the rotation device, the terminal edges 19 of the inner cylinder 12 are forced. The angle γ is set so that the tip surface 52 in the form of a conical surface of the second upsetting jig 50 is roughly vertical to the axial direction of the inner cylinder 12. Therefore, the angle γ is set roughly equal to the angle of inclination δ of the tip surface 52. Normally, the angle γ is set to the same angle as the angle of inclination β of the diameter diminishing jig 40.

Figure 7:
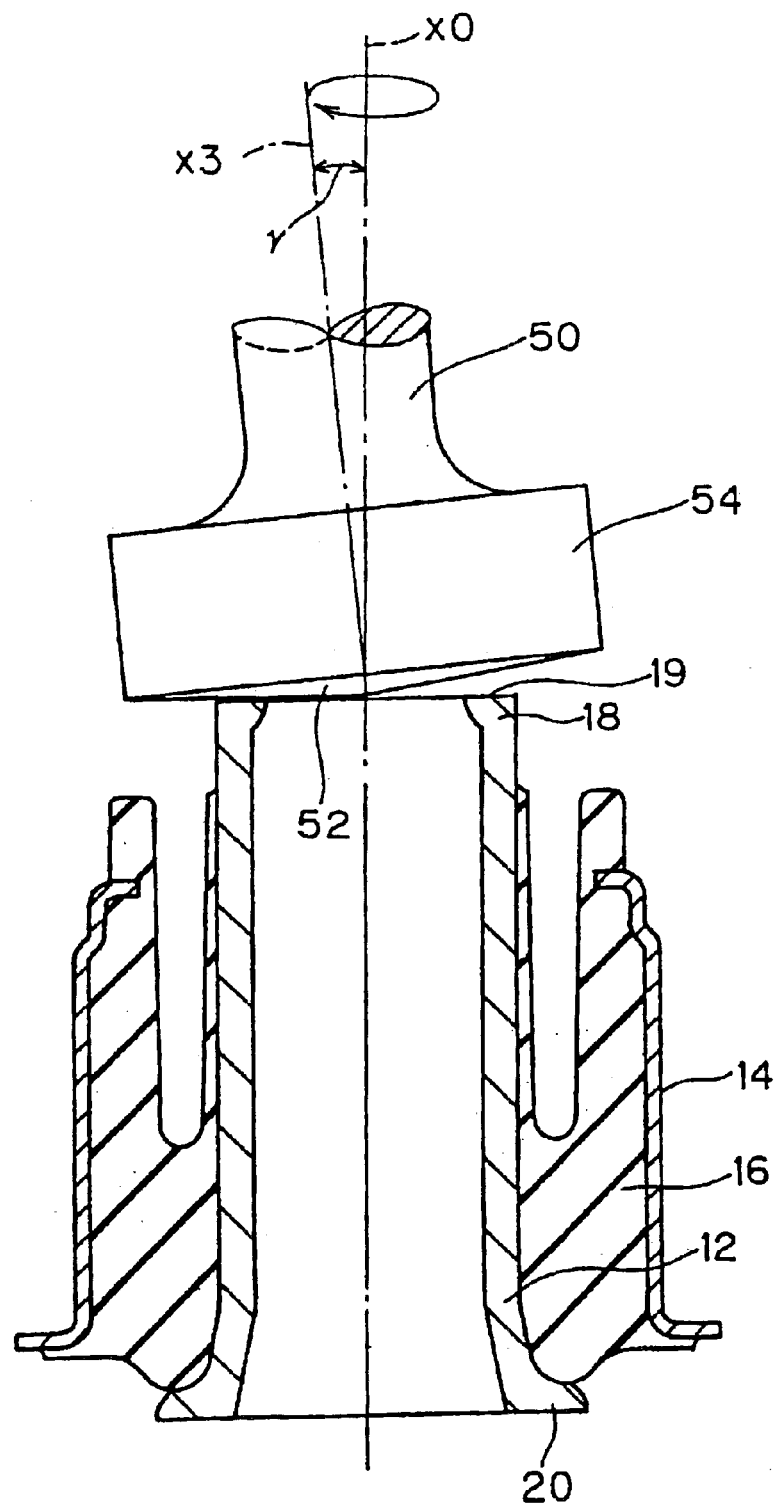
FIG. 7 is a sectional view of the third process at a final stage.

Thus, as shown in FIG. 7, when the outside diameter D at the extremities 18 of the inner cylinder 12 is nearly the same as the outside diameter prior to being diminished in diameter while turning the second upsetting jig 50 (that is, outside diameter at the center of the inner cylinder 12), the third process is completed.

Thus, as shown in FIG. 1, the outside diameter D of the inner cylinder 12 at the extremities 18 is not upset, that is, the outside diameter D does not change at all and still as it is, the inside diameter d only is diminished and the areas of the terminal edges 19 are enlarged. Besides, as for the other extremities 20 at the other end, since the inside diameter is upset and the outside diameter is more upset, the areas of the terminal extremities 21 are enlarged.

As shown in FIG. 1, as for the vibration isolating bushing 10 thus obtained, the outer cylinder 14 is press-fitted and fixed to an attachment hole 62 of a support member 60 of the suspension arm, etc., and the inner cylinder 12, into which an axial member 64 on the other support side is inserted, is fastened and fixed under a condition held between both sides by the support members 66 such as brackets. In detail, a bolt 68 at the tip of the axial member 64 is tightened and fixed by a nut 69 from outside of the support member 66.

According to the first embodiment described above, since both extremities 18, 20 of the inner cylinder 12 are subjected to cold plastic working to enlarge the terminal edges 19, 21, the areas capable of reducing surface pressures against axial force which is produced when being fastened by the support members 66, can be secured without increasing the thickness of the inner cylinder 12, also accomplishing lightweight and inexpensive products.

Further, since an inner diameter d at the extremities 18 is diminished, it is possible to position the bolt 68 when inserting the axial member 64 into the inner cylinder 12, and also provide good assembling operations of the vibration isolating bushing 10. Furthermore, since the inside diameter at the terminal edges 20 is upset, the axial member 64 is easy to insert into the inner cylinder 12.

Further, since a hollow portion 22 is bored in the axial direction on the terminal edges of the rubber elastomer 16, the areas at the terminal edges of the rubber elastomer 16 are large enough to secure a free length from elastic deformation.

Figure 11:
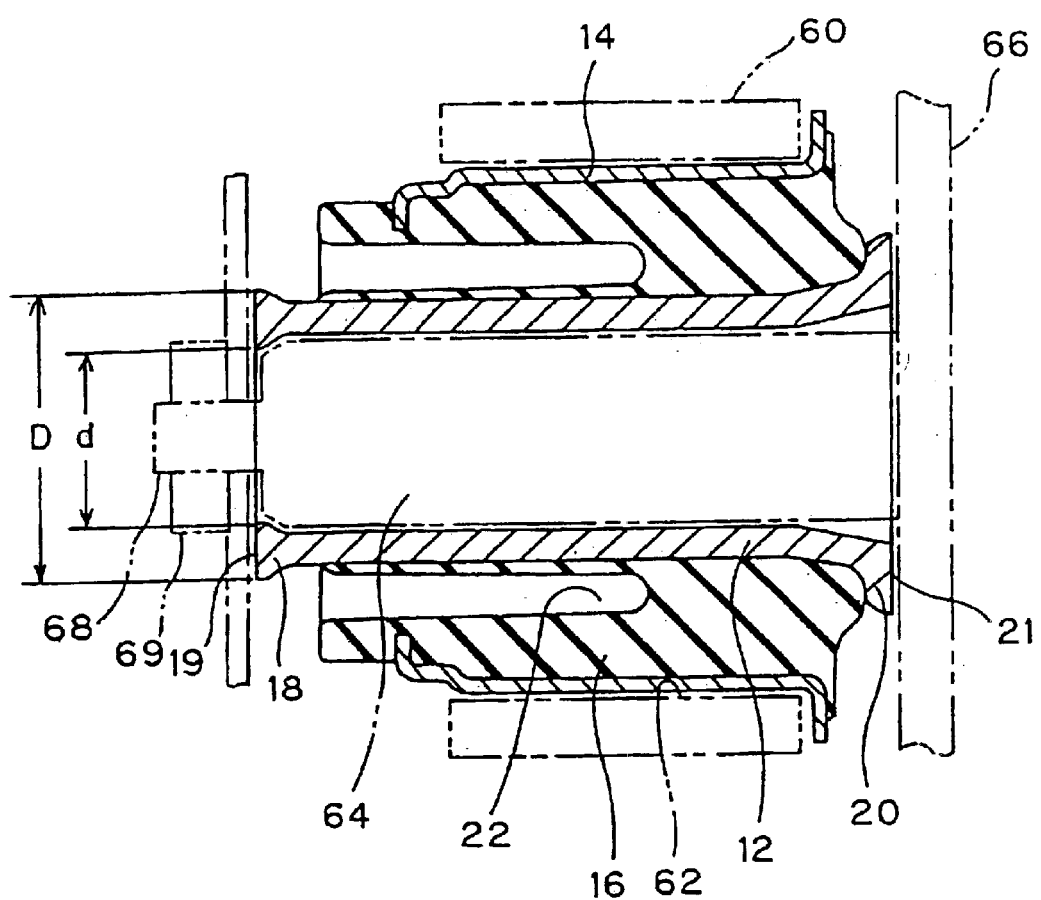
FIG. 11 is a sectional view of a vibration isolating bushing according to the second embodiment of the invention.

FIG. 11 is a sectional view of a vibration isolating bushing 70 according to the second embodiment of the invention. As for the vibration isolating bushing 70, since an outside diameter D is upset and an inside diameter d is diminished at the extremities 18 of the inner cylinder 12, thereby the terminal edges 19 are further enlarged than that in the first embodiment described above.

Figure 12:
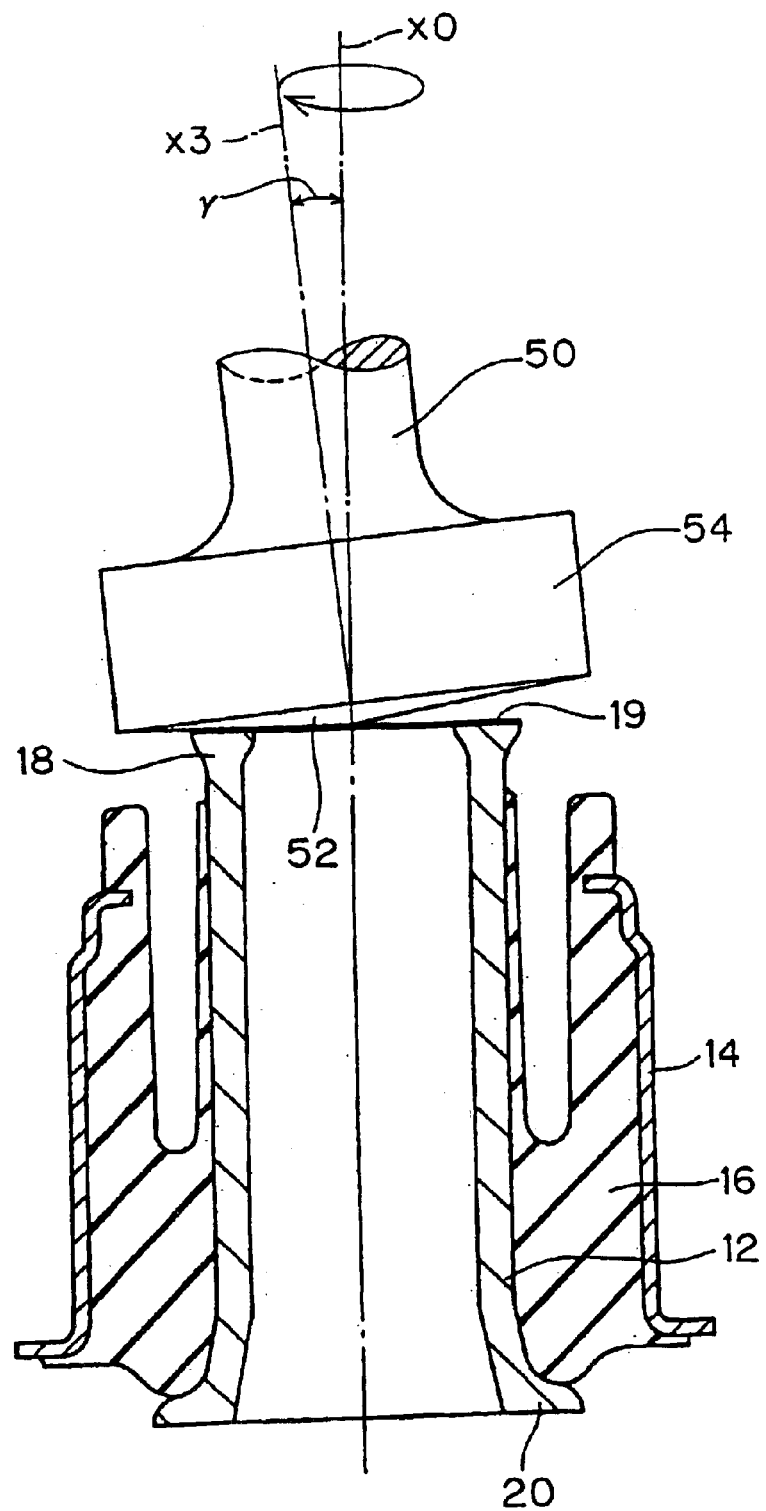
FIG. 12 is a sectional view of the third process at a final stage of the second embodiment.

In the second embodiment as shown in FIG. 12, during the third process of the first embodiment described above, the pressurization turning motion of the second upsetting jig 50 is continued to be carried out until the outside diameter D at the extremities 18 becomes larger than that prior to be diminished in diameter, thus the outside diameter D is made larger by the predetermined amount before finishing the pressurization turning motion.

In the second embodiment, the outside diameter D of the inner cylinder 12 at the extremities 18 is upset larger than that at the center of the inner cylinder 12 during enlarging process. However, since the extremities 18 are upset after vulcanization forming, as shown in FIG. 11, the same hollow portion 22 as that in the first embodiment can be provided at the terminal edges of the rubber elastomer 16 so as to sufficiently secure a free length of the rubber elastomer 16.

Figure 13:
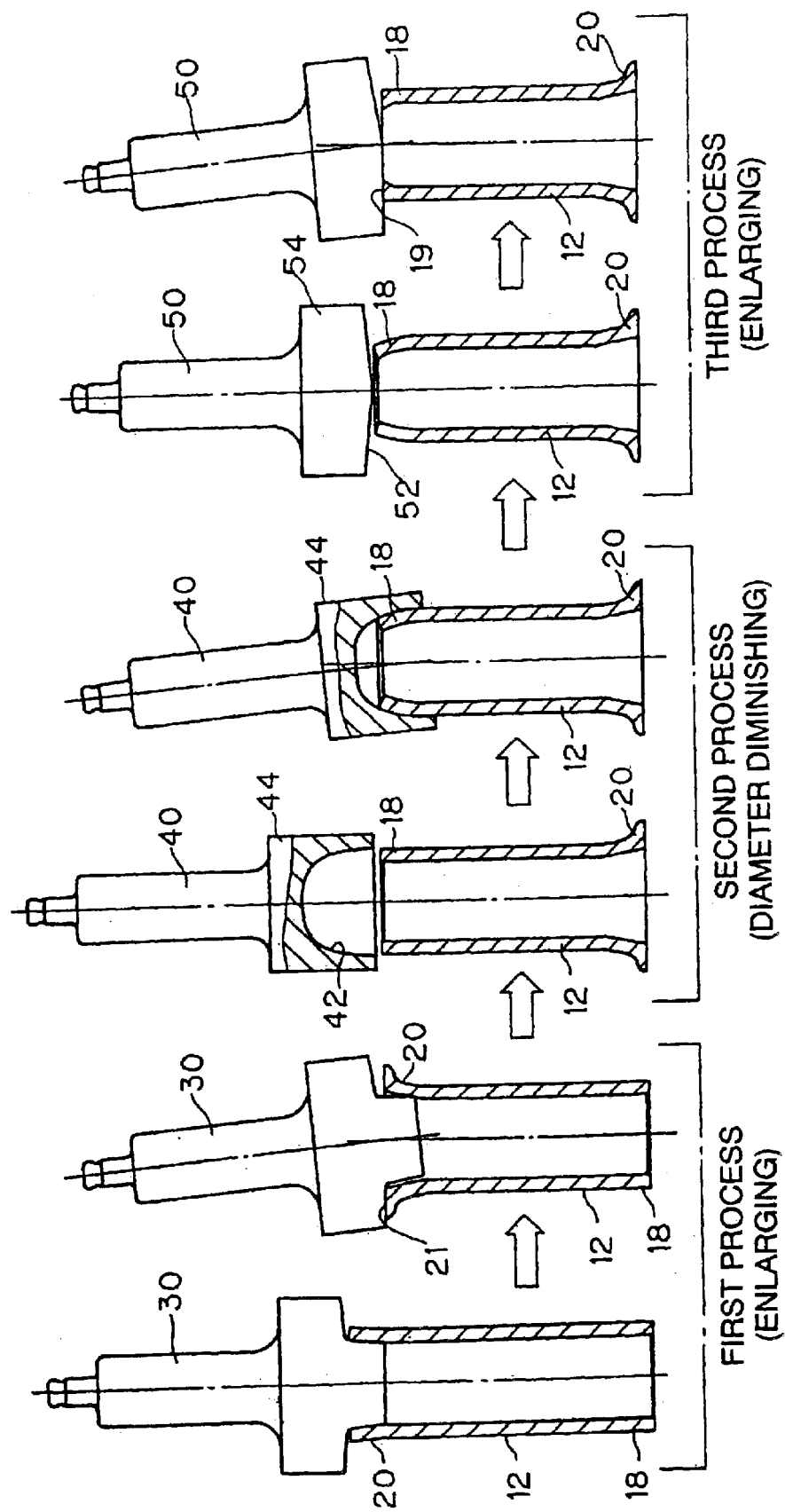
FIG. 13 is a process explanatory view showing the working method of the inner cylinder at the extremities according to the third embodiment of the invention.
Figure 14:
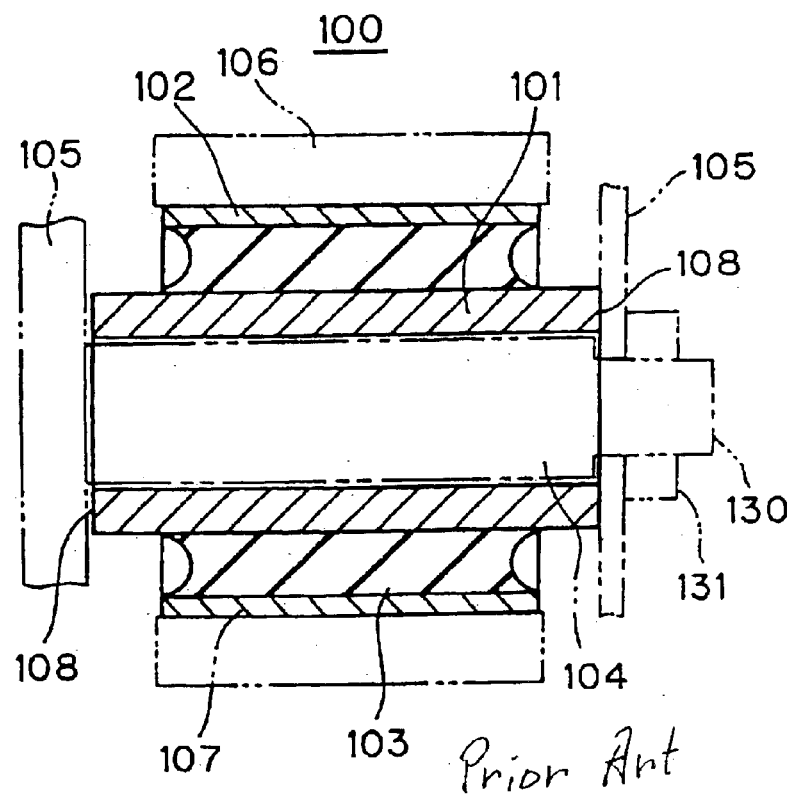
FIG. 14 is a sectional view showing an example of a conventional vibration bushing.
Figure 15:
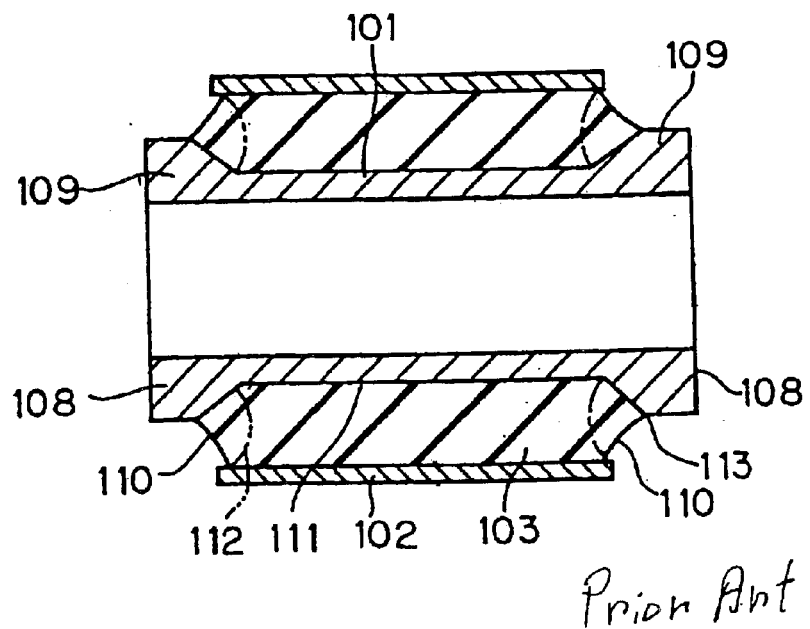
FIG. 15 is a sectional view showing another example of the conventional vibration bushing.
Figure 16:
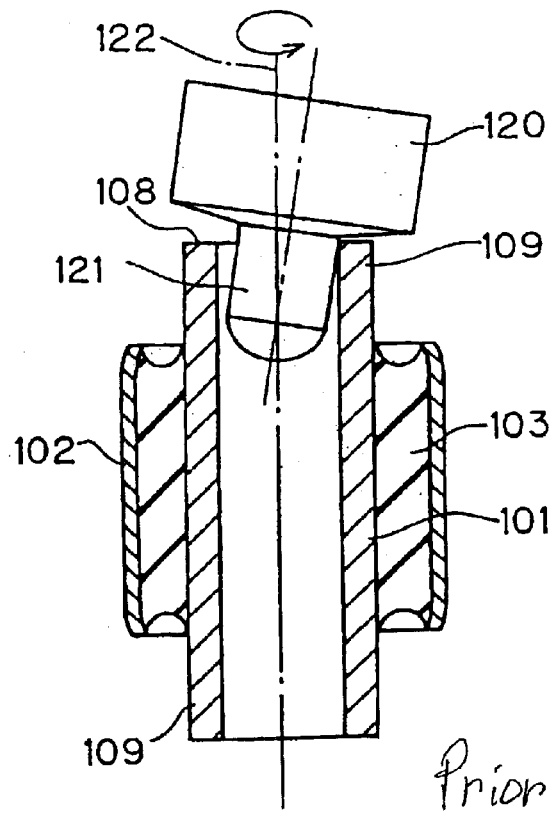
FIG. 16 is a sectional view showing the upsetting working of the conventional vibration bushing.
Figure 17:
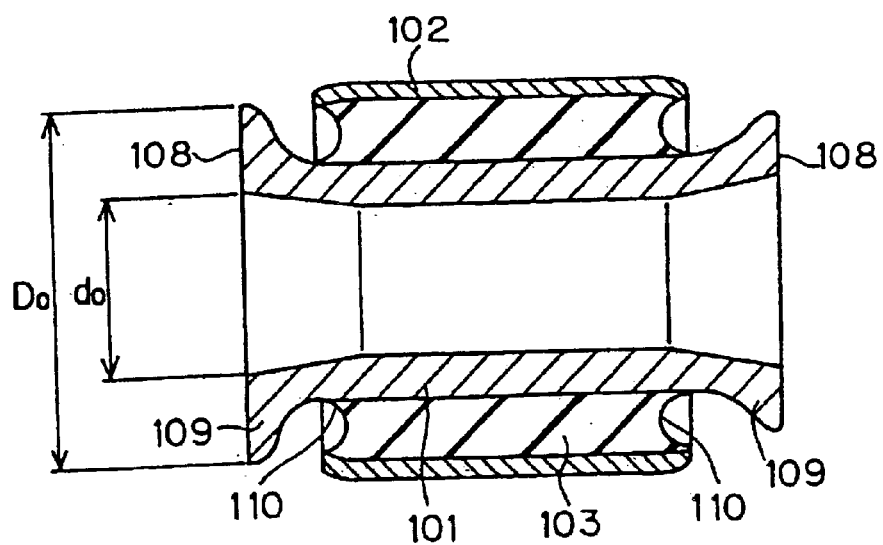
FIG. 17 is a sectional view of the vibration isolating bushing obtained by the upsetting working shown in FIG. 16.

FIG. 13 shows the working method of the inner cylinder 12 at the extremities according to the third embodiment of the invention. In the third embodiment, the first to the third processes, the same processes as those in the first embodiment described above for the inner cylinder 12, are to be carried out before vulcanization forming of the rubber elastomer 16.

Thus, since the extremities 18, 20 are plastic-worked on each individual inner cylinder 12 before performing vulcanization forming, it is preferable that the third process described above is carried out so that the outside diameter at the extremities 18 on the side, where the hollow portion 22 is formed, is almost equal to that before being diminished in diameter, whereby a free length of the rubber elastomer can sufficiently be secured.

Although the diameter diminishing process is carried out only at one extremity 18 of the inner cylinder 12 in the embodiments described above, this invention is not limited to it, and the diameter diminishing process can also be applied to both extremities. In the embodiments described above, the vibration isolating bushing of the type that the rubber elastomer 16 is interposed between the inner cylinder 12 and the outer cylinder 14, which is press-fitted into the attachment hole 62 of the support member 60, and stuck to both cylinders, has been described. Otherwise, the vibration isolating bushing of the type that the rubber elastomer 16 is stuck only to the outer circumference of the inner cylinder 12 by the vulcanization forming and used by being press-fitted into the attachment hole of the other support member, can also be applied similarly to that described above.

INDUSTRIAL APPLICABILITY

According to the extremity working method of a cylinder made of a metal of the present invention, a cylindrical body made of a metal, the axial extremities of which are diminished in diameter on the inside diameter side and the terminal edges of which are enlarged, can be obtained and preferably used for the parts of various machines including automobile parts such as vibration isolating bushing, etc.

Besides, according to the manufacturing method of the vibration isolating bushing of the invention, the vibration isolating bushing, the areas of the terminal edges of which are secured largely without increasing the thickness of entire inner cylinder, having an inner cylinder of diminished inside diameter, is obtained. Accordingly, the terminal edges of the inner cylinder can be enlarged with reduced weight and cost, and their surface pressure against axial force, which is produced when fastening to a support member, can also be reduced. By diminishing the inside diameter of the inner cylinder at the extremities, it is possible to position a bolt on an axial member inserting into the inner cylinder, thus being excellent in assembling operations of the vibration isolating bushing.

What is claimed is:

1. A method for manufacturing a vibration isolating bushing that comprises a metal inner cylinder, a rubber elastomer on an outer circumference of the metal inner cylinder, and an axial member in the metal inner cylinder, said method comprising:

enlarging a first terminal edge surface of a first axial extremity of the metal inner cylinder by cold plastic working with an upsetting jig pressed against the first terminal edge surface;

diminishing a second terminal edge surface diameter of a second axial extremity of the metal inner cylinder by cold plastic working with a diameter diminishing jib pressed against the second terminal edge surface;

enlarging the second terminal edge surface by cold plastic working with an upsetting jig pressed against the second terminal edge surface;

vulcanizing a rubber to form said rubber elastomer on the outer circumference of the metal inner cylinder; and inserting the axial member in the metal inner cylinder.

2. The method as set forth in claim 1, wherein the steps of enlarging the first terminal edge surface, diminishing the second terminal edge surface diameter and enlarging the second terminal edge surface are performed after the step of vulcanizing the rubber.

3. The method as set forth in claim 1, wherein the step of vulcanizing the rubber is performed after the steps of enlarging the first terminal edge surface, diminishing the second terminal edge surface diameter and enlarging the second terminal edge surface.

4. The method as set forth in claim 1, wherein the diameter diminishing jig is provided with a concave portion covering the second axial extremity of the metal inner cylinder, an inner diameter of the concave portion becomes smaller toward the center of the concave portion, an inner circumferential surface of the concave portion is pressed against a circumferential surface of said second axial extremity while the diameter diminishing jig is turned and moved around an axis of the metal inner cylinder during the step of diminishing the second terminal edge diameter.

5. The method as set forth in claim 1, wherein the upsetting jig used in the step of enlarging the second terminal edge surface has nearly flat tip surface, the tip surface is pressed against the second terminal edge surface of the metal inner cylinder while the upsetting jig is turned and moved around an axis of the metal inner cylinder during the step of enlarging the second terminal edge surface.

6. The method as set forth in claim 5, wherein the tip surface of the upsetting jig slightly projects in the form of a conical surface, the upsetting jig is inclined against the axis of the metal inner cylinder so that the conical surface becomes roughly perpendicular to the axis of the metal inner cylinder during the step of enlarging the second terminal edge surface.

7. The method as set forth in claim 1, wherein the step of enlarging the second terminal edge surface comprises pressing and turning the upsetting jig, whereby an outside diameter of said second axial extremity becomes nearly equal to that prior to being diminished.

8. The method as set forth in claim 1, wherein the step of enlarging the second terminal edge surface comprises pressing and turning the upsetting jig, whereby an outside diameter of said second axial extremity becomes larger than that prior to being diminished.

9. A vibration isolating bushing manufactured by a method as set forth in claim 1.

* * * * *